(12) United States Patent
Perrin

(10) Patent No.: US 7,474,021 B2
(45) Date of Patent: Jan. 6, 2009

(54) COOLING ASSEMBLY FOR ELECTRIC MACHINE

(75) Inventor: Didier Perrin, Montréal (CA)

(73) Assignee: TM4 Inc., Boucherville (CA)

( * ) Notice: Subject to any disclaimer, the term of this patent is extended or adjusted under 35 U.S.C. 154(b) by 138 days.

(21) Appl. No.: 10/573,562

(22) PCT Filed: Nov. 24, 2004

(86) PCT No.: PCT/CA2004/002027

§ 371 (c)(1),
(2), (4) Date: Feb. 23, 2007

(87) PCT Pub. No.: WO2005/055396

PCT Pub. Date: Jun. 16, 2005

(65) Prior Publication Data

US 2007/0152518 A1      Jul. 5, 2007

(30) Foreign Application Priority Data

Dec. 4, 2003   (CA) .................................. 2452085

(51) Int. Cl.
  *H02K 9/16* (2006.01)
  *H02K 9/19* (2006.01)
(52) U.S. Cl. .............................. 310/52; 310/54; 310/58

(58) Field of Classification Search .................. 310/52, 310/54, 58
See application file for complete search history.

(56) References Cited

U.S. PATENT DOCUMENTS

| | | | | |
|---|---|---|---|---|
| 3,009,072 A | * | 11/1961 | Mossay | 310/57 |
| 3,049,634 A | * | 8/1962 | Horsley | 310/64 |
| 5,767,600 A | | 6/1998 | Whiteley | 310/184 |
| 5,859,482 A | | 1/1999 | Crowell et al. | 310/58 |
| 6,633,097 B2 | | 10/2003 | Dunlap et al. | 310/54 |
| 6,727,600 B1 | * | 4/2004 | Abdurachmanov | 290/54 |
| 6,819,016 B2 | * | 11/2004 | Houle et al. | 310/52 |
| 6,960,851 B2 | * | 11/2005 | Poulin et al. | 310/52 |

FOREIGN PATENT DOCUMENTS

CA         2234488         10/1999

* cited by examiner

*Primary Examiner*—Burton Mullins
(74) *Attorney, Agent, or Firm*—Fulbright & Jaworski L.L.P.

(57) ABSTRACT

A cooling assembly to be inserted in electric machines includes a generally cylindrical body to be inserted inside the internal stator of an electric machine. The body includes a top surface provided with angled bores forming V-shaped channels inside the body. Intersecting V-shaped channels are closed by plugs to thereby define a continuous cooling channel inside the body.

24 Claims, 4 Drawing Sheets

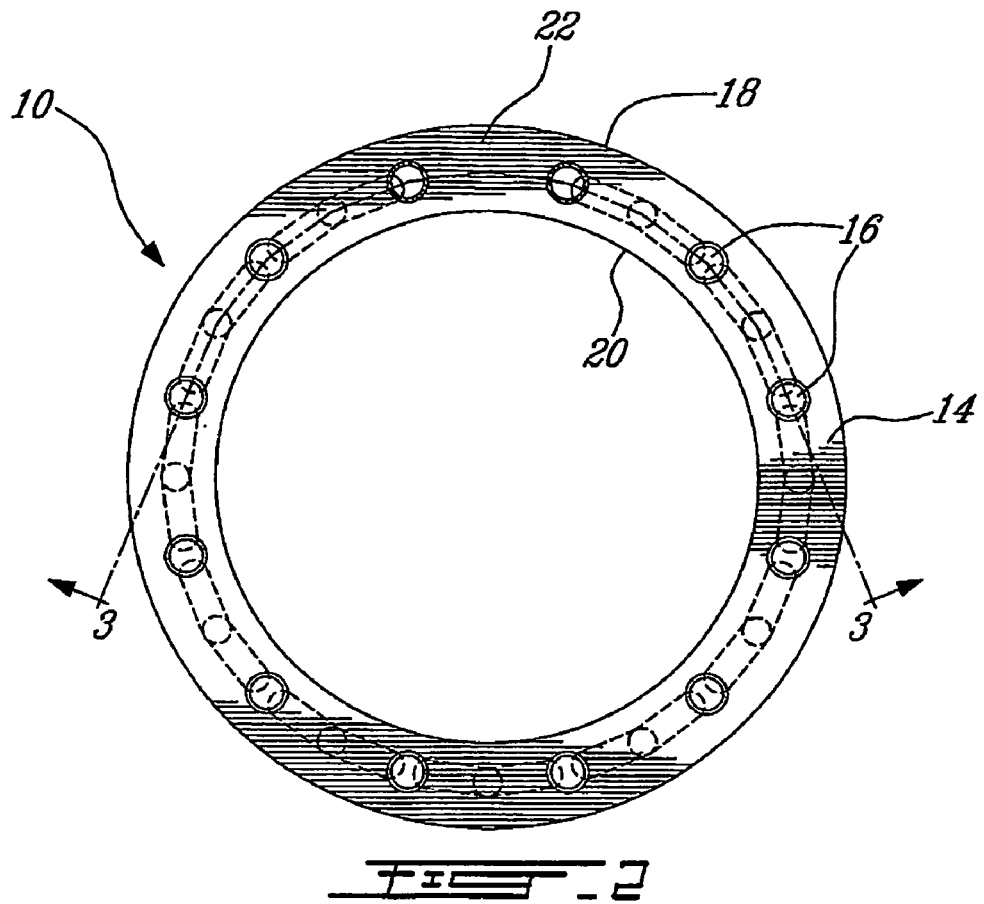
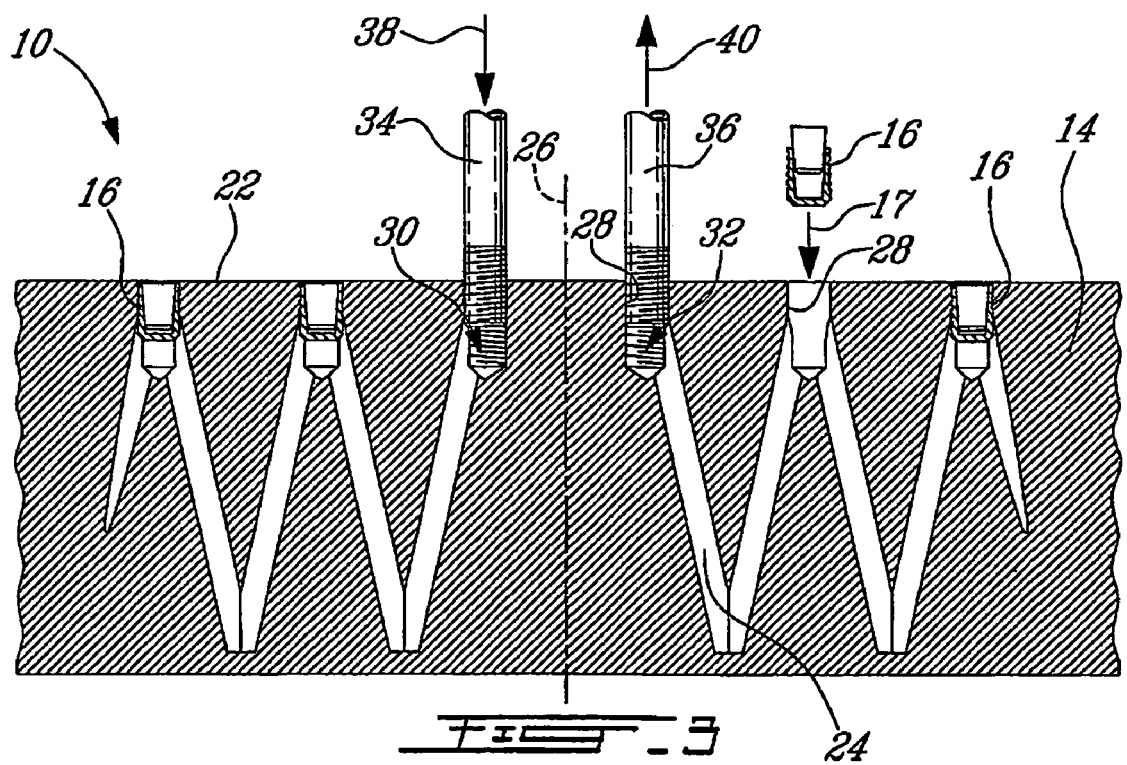

COOLING ASSEMBLY FOR ELECTRIC MACHINE

FIELD OF THE INVENTION

The present invention relates to electric machines. More specifically, the present invention is concerned with a cooling assembly to be mounted inside the stator of an electric machine.

BACKGROUND OF THE INVENTION

Electric machines are well known in the art. They usually have a fixed stator and a rotating rotor. Generally the stator is external and the rotor is rotatably mounted inside the stator, coaxially therewith.

In some electric machines, the stator is internal and the cylindrical rotor is coaxially mounted outside the stator. These machines will be referred herein as internal stator electric machines.

Cooling internal stator machines is a challenge since one cannot rely on the air surrounding the stator as a cooling medium. Indeed, it is well known that heat is mainly generated inside the stator of an electric machine. When the stator is external, fins may be added to the machine casing and the machine may be cooled by convection. However, when the stator is surrounded by the rotor, convection cooling may not take place and heat must be extracted from the internal stator.

OBJECTS OF THE INVENTION

An object of the present invention is therefore to provide a cooling device for an electric machine.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 2 is a top plan view of the cooling device of FIG. 1;

FIG. 3 is a sectional view taken along line 3-3 of FIG. 2;

DETAILED DESCRIPTION

Generally stated, the present invention proposes to use a generally cylindrical body to be inserted inside the generally cylindrical internal stator of an electric machine. The body includes a top surface provided with angled bores forming V-shaped channels inside the body. Intersecting V-shaped channels are closed by plugs to thereby define a continuous cooling channel inside the body.

Figure 1:
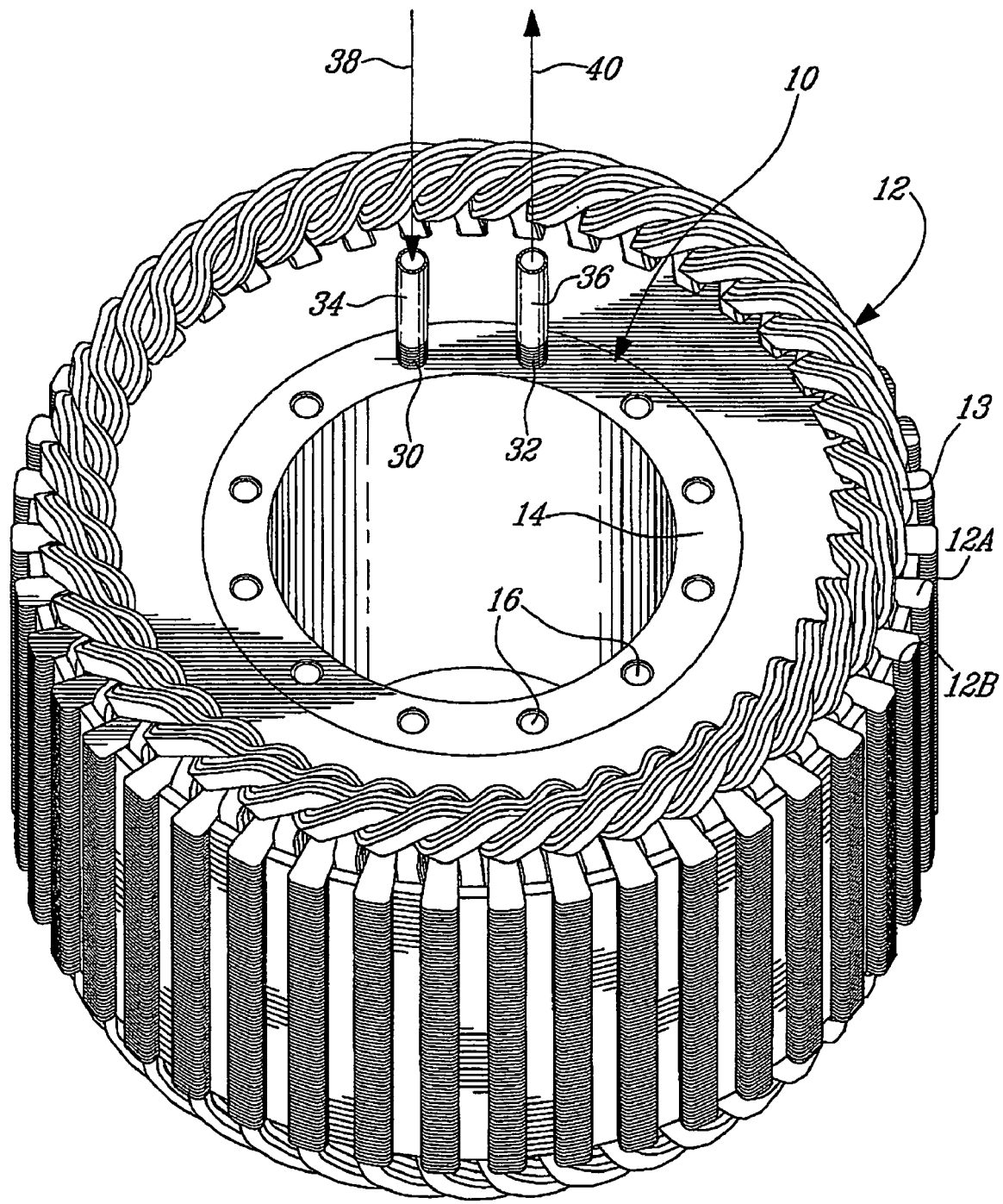
FIG. 1 is a perspective view of an internal stator of an electric machine provided with a cooling device according to a first embodiment of the present invention.

FIG. 1 of the appended drawings illustrates a cooling assembly 10 mounted inside an internal stator 12 of an electric machine.

The internal stator 12 includes a plurality of laminations 12a that are stacked to provide the desired stator thickness. The laminations 12a include peripheral notches 12b configured and sized to receive coils 13 therein. Since the stators of electric machines are believed well known in the art, they will not be further described herein.

The cooling assembly includes a cylindrical body 14 having a generally circular cross-section and plugs 16 as will be described hereinbelow.

As can be better seen from FIG. 2, the body 14 includes an external surface 18, an internal surface 20 and a top surface 22. The external surface 18 is so configured and sized as to contact the internal surface of the stator 12 when inserted therein.

Turning now to FIG. 3 of the appended drawings, the top surface 22 of the body 14 includes bores 24 that are angled with respect to a longitudinal axis 26 of the body 14. The bores 24 are so spaced and angled that they meet in the vicinity of their bottom end with an adjacent bore 24 before the body 14 is completely traversed. Closed V-shaped channels are thus formed by adjacent bores.

At the surface 22, adjacent V-shape channels are so positioned that their top portion meet with adjacent V-shaped channels.

A longitudinal interconnecting hole 28 is made at the junction of each V-shaped channel with adjacent V-shaped channels. These interconnecting holes 28 are so configured and sized as to receive a deformable plug 16 therein.

Deformable plugs are well known in the art and will not be described in detail herein. For example, the Betaplug™ manufactured by the Lee Company, Westbrook, Conn., USA, has been found an adequate plug 16. Generally stated, a deformable plug includes two elements, a plug and a pin. Once inserted into a pre-formed aperture, the pin is driven into the plug to conform the plug to the aperture and thus seal the aperture.

Accordingly, once the plugs 16 are inserted in the interconnecting holes 28 (see arrow 17) and deformed therein, a closed cooling circuit is formed in the material forming the body 12. This cooling circuit has an inlet 30 and an outlet 32 that are provided with respective connectors 34 and 36 mounted thereto.

The body may be made of any material that conducts heat and that may be formed to define the V-shaped channels and may accept deformable plugs. Example of such material include aluminum, aluminum alloys, brass, Sintered Metal Compound (SMC) and the like.

One skilled in the art will understand that the manufacture of the cooling assembly 10 is simple. The main steps are the formation of the body 14 having the required dimensions; the drilling of the angled bores 24 (by using a drill-press, for example); the drilling of the longitudinal interconnecting holes 28 (by using a drill-press, for example); the insertion of the plugs 16 in the longitudinal interconnecting holes 28; the deformation of the plugs 16 inside the holes 28; the insertion of the connectors 34 and 36 inside the respective inlets and outlet 30 and 32.

It Is to be noted that the insertion of the plugs in the interconnecting holes 28 may require the tapering of the holes 28. Of course, the instructions of the plug manufacturer should be followed.

In operation, the cooling assembly 10 is inserted in the Stator 12. Many methods may be used for this insertion. For example, the stator may be heated to slightly expand its central aperture and the cooling assembly may be cooled to contract it to facilitate the insertion. An adhesive may be used between the two mating surfaces.

When the stator 12 is so assembled, it may be mounted to a casing (not shown) and receive a rotor (not shown) to yield an electric machine. When the machine is energized, heat is generated in the stator and transferred to the body 14 by the contact between the inner surface of the stator 12 and the outside surface 18 of the body 14. This transferred heat may be extracted from the body 14 by the circulation of a cooling fluid such as water that enters the cooling circuit by the inlet 30 (see arrow 38) and egress the cooling circuit by the outlet 32 (see arrow 40). The flow rate of the cooling fluid may be adjusted according to the quantity of heat to be extracted therefrom.

Figure 4:
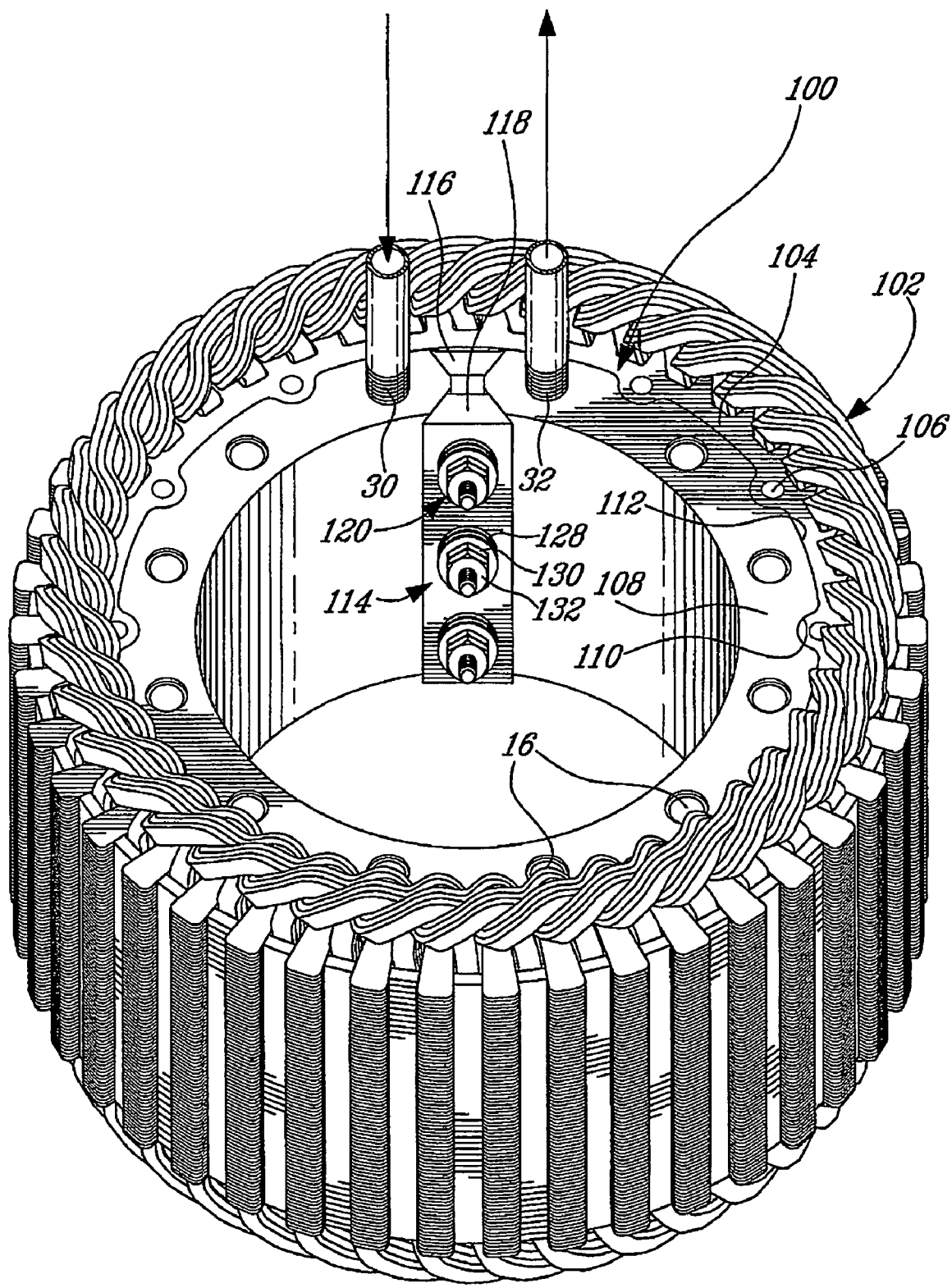
FIG. 4 is a perspective view of an internal stator of an electric machine provided with a cooling device according to a second embodiment of the present invention.
Figure 5:
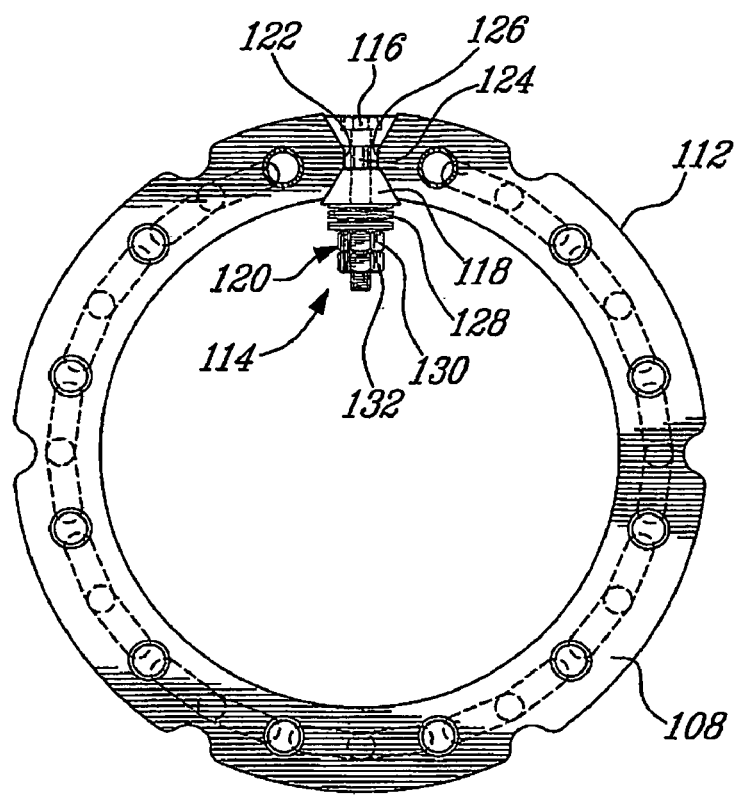
FIG. 5 is a top plan view of the cooling device of FIG. 4.

Turning now to FIGS. 4 and 5 of the appended drawings, a cooling assembly 100 according to a second embodiment of the present invention will be described. Since the cooling assembly 100 is very similar to the cooling assembly 10 illustrated in FIGS. 1 to 3 and described hereinabove, only the differences between these cooling assemblies will be described hereinbelow.

As can be seen from FIG. 4, the laminations 102 forming the stator 104 have a bigger opening and are provided with mounting apertures 106 useful to mount the stator 104 to the machine (not shown).

Accordingly, the cooling assembly 100 has a larger diameter body 108 provided with longitudinal channels 110 provided on its outside surface 112 to accommodate the openings 106.

The main difference between the cooling assembly 100 and the cooling assembly 10 concerns a biasing assembly 114 used to mount the cooling assembly 100 inside the stator 104 and to maintain it therein.

The biasing assembly 114 is so configured and sized as to bias the contact surface 112 of the body 108 against the internal surface of the stator 104 when the cooling device 100 is positioned therein.

As can be better seen from FIG. 5, the biasing assembly 114 includes first and second wedging elements 116 and 118 maintained together by fastening assemblies 120. The biasing assembly 114 is to be mounted to the body 108 via opposed surfaces 122 and 124 of the body 108 as will be described hereinbelow. These opposed surfaces are defined by the generally C-shape of the body 108.

The first and second opposed surfaces 122 and 124 are convex. More specifically, each of the first and second surfaces presents a substantially trapezoidal cross-section. In addition, the first and second wedging devices 116 and 118 each have a trapezoidal cross-section and have a longitudinal dimension substantially equal to a longitudinal dimension of the body 108.

The number of fastening assemblies 120 is not critical. Each fastening assembly 120 includes a deformable and biasing portion that transmits a reaction force to the first and second wedging devices 116 and 118 as will be described hereinbelow.

Each of the first and second wedging devices 116 and 118 includes fastening apertures to accept a part of the fastening assembly. Furthermore, the wedging device 116 includes shoulder portions (not shown) to accept the head of a fastener.

Each fastening assembly 120 includes a bolt 126 inserted through the shoulder portion and the matched fastening apertures of the first and second wedging devices 116 and 118. A deformable portion in the form of disc springs 128 is inserted onto each bolt 126 between the second wedging device 118 and a respective first nut 130. The disc springs 128 include, for example, one or more Belleville spring washers mounted in series. However, many other types of disc springs could be used. In addition, a second nut 132 is threaded onto each bolt 126 to positively lock the nuts onto the bolt.

To mount the cooling device 100 in the stator 104, the cooling device 100 without the biasing assembly 114, or with the biasing assembly 114 in a non-biasing position, is inserted inside the cavity of the stator 104. The nuts 128 of the fastening assemblies 120 are then tightened until a good contact exists between the external surface 112 of the body 100 and the internal surface of the stator 22. Indeed, by tightening the fastener assemblies 120, the wedging devices 116 and 118 are pulled towards one another. The corresponding trapezoidal shape of the wedging devices 116 and 118 and of the first and second opposed surfaces 122 and 124 force the opposed surfaces 122 and 124 apart from one another, thereby forcing the external surface 112 onto the internal surface of the stator 104.

Figure 6:
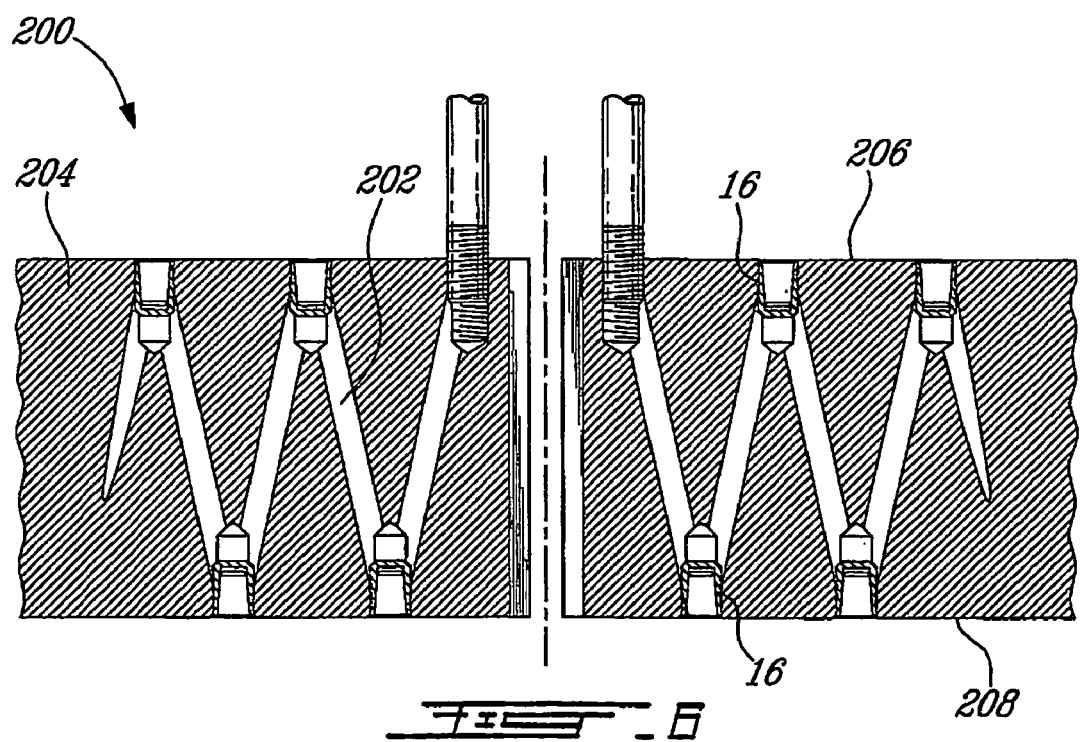
FIG. 6 is a sectional view similar to FIG. 3 but illustrating a cooling device according to a third embodiment of the present invention.

Turning now to FIG. 6 of the appended drawings, a cooling assembly 200 according to a third embodiment of the present invention will be described. Again, since the cooling assembly 200 is very similar to the cooling assembly 10 illustrated in FIGS. 1 to 3 and to the cooling assembly 100 illustrated in FIGS. 4 and 5 and described hereinabove, only the differences between these cooling assemblies will be described hereinbelow.

It is to be noted that FIG. 6 is very similar to FIG. 2. The main difference between the cooling assembly 10 and the cooling assembly 200 is that the angle of the bores 202 and the distance between these bores is such that the length of the body 204 of the cooling assembly 200 is traversed by the bores 202. Accordingly, plugs 16 are provided on both the top and bottom surfaces 206 and 208 of the body 204 to create the cooling circuit inside the body 204.

It is to be noted that while the body of the cooling assembly is shown herein as having a circular cross-section, other tubular cross-sections could be used. For example, the body could have a hexagonal cross-section. Furthermore, the radial thickness of the body 10 may vary according to the heat accumulation required.

It is also to be noted that while the above description is concerned with a cooling assembly provided with a machined cooling element, sintered metal compounds (SMC) materials could be used to form a body having the bores integrally formed therein.

Although the present invention has been described hereinabove by way of preferred embodiments thereof, it can be modified, without departing from the spirit and nature of the subject invention as defined in the appended claims.

What is claimed is:

1. A cooling assembly for an internal stator of an electric machine; said cooling assembly comprising a generally tubular body configured and sized to be inserted inside the internal stator; said body including a top surface; said body being provided with a cooling circuit having:
    an inlet;
    an outlet;
    at least two pairs of bores provided on said top surface; each pair of bores configured and sized as to define a V-shaped channel; said bores distanced on said top surface that each said V-shaped channel intersects with at least one adjacent V-shaped channel; intersections of said V-shaped channels closed via plugs; one of said at least two pairs of bores associated with said inlet and another of said at least two pairs of bores associated with said outlet.

2. The cooling assembly of claim 1, wherein said generally tubular body has a generally cylindrical outer surface and wherein the internal stator has a generally cylindrical inner surface.

3. The cooling assembly of claim 2 further comprising a biasing assembly so mounted to said tubular body as to bias said outer surface of said body towards the inner surface of the stator.

4. The cooling assembly of claim 3, wherein said generally tubular body has a C-shaped cross-section defining opposed surfaces; said biasing assembly mountable to said opposed surfaces to spread them apart.

5. The cooling assembly of claim 4, wherein said biasing assembly includes first and second wedging elements interconnected by at least one fastener; said biasing assembly being so mountable to said opposed surfaces that the fastening of said at least one fastener force the first and second wedging elements toward each other, thereby forcing said opposed surfaces apart.

6. The cooling assembly of claim 1, wherein each said at least two pairs of bores include a first angled bore and a second angled bore so angled with respect to a longitudinal axis of said body and so distanced as to define said V-shaped channel.

7. The cooling assembly of claim 1, wherein said plugs used to close intersecting V-shaped channels are deformable plugs.

8. The cooling assembly of claim 1, wherein each said bores reach a bottom surface of said body; each said pair of bores including a plug provided on said bottom surface of said body to close said bores and define the V-shaped channel.

9. The cooling assembly of claim 1, wherein said body is made from material selected from the group consisting of aluminum, aluminum alloys, brass and Sintered Metal Compound.

10. A cooling assembly for an internal stator of an electric machine; said cooling assembly comprising a generally tubular body so configured and sized as to be inserted inside the internal stator; said body including a top surface provided with at least two pairs of bores defining V-shaped channels; said cooling assembly further comprising plugs so inserted into said bores as to close intersections of said V-shaped channels.

11. The cooling assembly of claim 10, wherein said generally tubular body has a generally cylindrical outer surface and wherein the internal stator has a generally cylindrical inner surface.

12. The cooling assembly of claim 11 further comprising a biasing assembly so mounted to said tubular body as to bias said outer surface of said body towards the inner surface of the stator.

13. The cooling assembly of claim 12, wherein said generally tubular body has a C-shaped cross-section defining opposed surfaces; said biasing assembly being mountable to said opposed surfaces to spread them apart.

14. The cooling assembly of claim 13, wherein said biasing assembly includes first and second wedging elements interconnected by at least one fastener; said biasing assembly being so mountable to said opposed surfaces that the fastening of said at least one fastener force the first and second wedging elements toward each other, thereby forcing said opposed surfaces apart.

15. The cooling assembly of claim 10, wherein each said at least two pairs of bores include a first angled bore and a second angled bore so angled with respect to a longitudinal axis of said body and so distanced as to define said V-shaped channel.

16. The cooling assembly of claim 10, wherein said plugs used to close intersecting V-shaped channels are deformable plugs.

17. The cooling assembly of claim 10, wherein each said bores reach a bottom surface of said body; each said pair of bores including a plug provided on said bottom surface of said body to close said bores and define the V-shaped channel.

18. A cooling assembly for an internal stator of an electric machine; said cooling assembly comprising a generally tubular body configured and sized to be inserted in the internal stator; said body including a top surface; said body provided with a cooling circuit having:
   an inlet provided in said top surface;
   a first V-shaped channel associated with said inlet; said first V-shaped channel defined by a first angled bore in the top surface and a second angled bore in the top surface;
   at least one second V-shaped channel each defined by a first angled bore in the top surface and a second angled bore in the top surface; one of said at least one second V-shaped channel intersecting with said first V-shaped channel; said at least one second V-shaped channel intersecting with adjacent second V-shaped channels;
   an outlet provided in said top surface;
   a third V-shaped channel associated with said outlet; said third V-shaped channel being defined by a first angled bore done in the top surface and a second angled bore in the top surface; said third V-shaped channel intersecting with one of said at least one second V-shaped channel;
   wherein when V-shaped channels intersect, a plug is inserted at the intersection.

19. The cooling assembly of claim 18, wherein said generally tubular body has a generally cylindrical outer surface and wherein the internal stator has a generally cylindrical inner surface.

20. The cooling assembly of claim 19 further comprising a biasing assembly so mounted to said tubular body as to bias said outer surface of said body towards the inner surface of the stator.

21. The cooling assembly of claim 20, wherein said generally tubular body has a C-shaped cross-section defining opposed surfaces; said biasing assembly being mountable to said opposed surfaces to spread them apart.

22. The cooling assembly of claim 21, wherein said biasing assembly includes first and second wedging elements interconnected by at least one fastener; said biasing assembly being so mountable to said opposed surfaces that the fastening of said at least one fastener force the first and second wedging elements toward each other, thereby forcing said opposed surfaces apart.

23. The cooling assembly of claim 18, wherein said plugs used to close intersecting V-shaped channels are deformable plugs.

24. The cooling assembly of claim 18, wherein each said bores reach a bottom surface of said body; each said pair of bores including a plug provided on said bottom surface of said body to close said bores and define the V-shaped channel.

* * * * *

UNITED STATES PATENT AND TRADEMARK OFFICE
CERTIFICATE OF CORRECTION

PATENT NO.         : 7,474,021 B2             Page 1 of 1
APPLICATION NO. : 10/573562
DATED              : January 6, 2009
INVENTOR(S)        : Didier Perrin It is certified that error appears in the above-identified patent and that said Letters Patent is hereby corrected as shown below:

In claim 1, column 4, line 55, delete "being".

In claim 18, column 6, line 31, delete "done".

Signed and Sealed this

Twenty-fourth Day of March, 2009

JOHN DOLL
*Acting Director of the United States Patent and Trademark Office*